Nov. 24, 1936.  W. T. WELLS  2,061,864

ELECTRICALLY OPERATED FISHING TOOL

Filed July 14, 1934

INVENTOR
WALTER T WELLS
BY Lloyd Spencer
ATTORNEY

Patented Nov. 24, 1936

2,061,864

UNITED STATES PATENT OFFICE 2,061,864

ELECTRICALLY OPERATED FISHING TOOL

Walter T. Wells, Glendale, Calif., assignor to The Technicraft Engineering Corporation, Los Angeles, Calif., a corporation of California Application July 14, 1934, Serial No. 735,211

2 Claims. (Cl. 294—106)

My invention relates to electrically operated fishing tools and the objects of my invention are:

First, to provide a tool of this class which is adapted to be lowered into wells whether dry or filled with liquid or drilling mud and be manipulated electrically to grasp objects which may be lodged in the well;

Second, to provide a tool of this class which may be readily and quickly changed and new jaws substituted whereby jaws most suited to grasp the particular objects or "fish" may be used;

Third, to provide a tool of this class which, by means of its electrical character of operation, the operator may determine from the load on the supporting cable and the current supplied to the tool whether or not the tool is in engagement with the "fish", and Fourth, to provide a tool of this class which is particularly simple and economical of construction and of operation, durable, efficient in its action and which will not readily deteriorate.

With the above and other objects in view as may appear hereinafter, reference is made to the drawing, in which.

Figure 3:
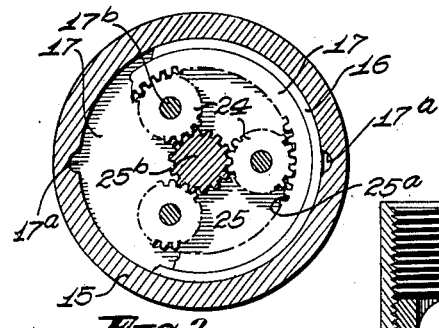
Fig. 3 is a transverse sectional view thereof through 3—3 of Fig. 1.
Figure 2:
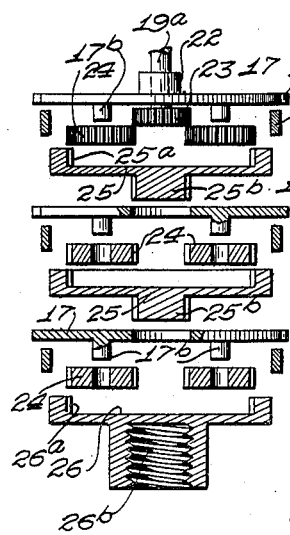
Fig. 2 is a diagrammatic view of the gear train used in my fishing tool with the various elements thereof shown in spaced relation to facilitate illustration.
Figure 1:
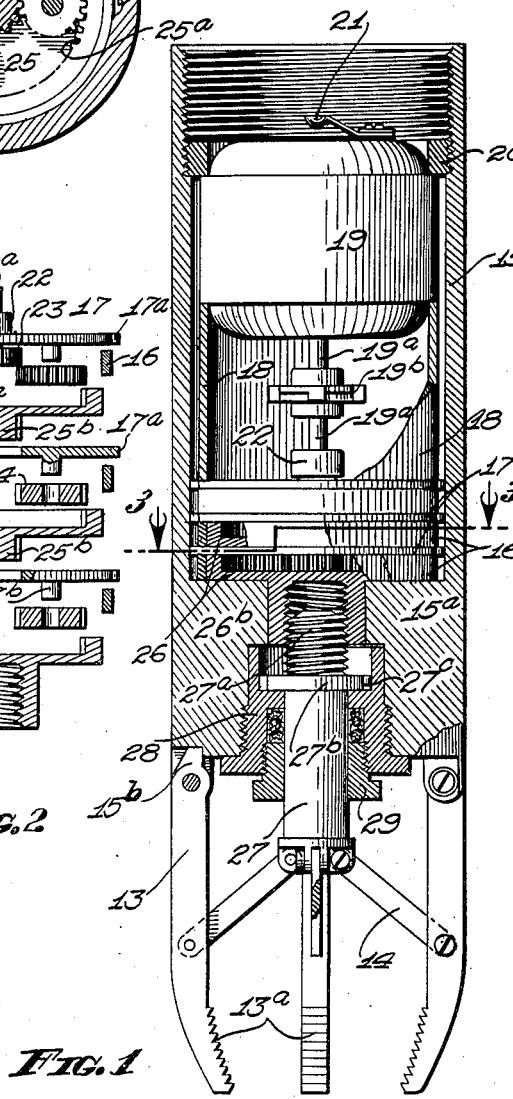
Fig. 1 is a longitudinal sectional view of my fishing tool shown disconnected from its supporting cable.
Figure 4:
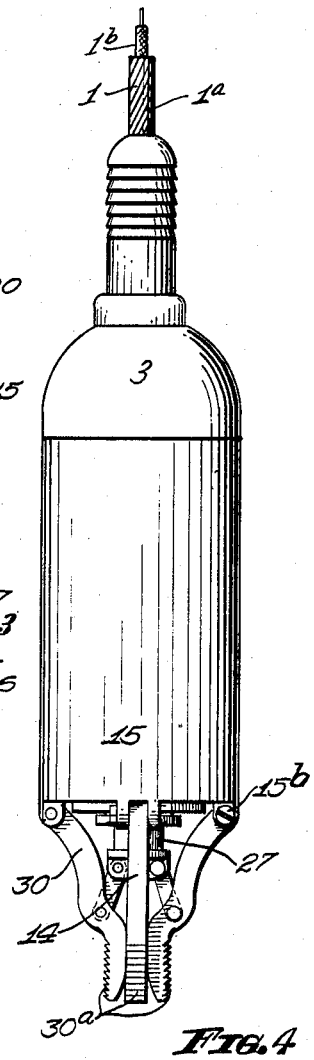
Fig. 4 is a reduced elevational view of my fishing tool showing it attached to a supporting cable and illustrating a modified form of the jaw means.

As shown in Fig. 4, the fishing tool is suspended from a special cable 1 having an outer weight supporting lay 1a and a core therein through which extends an insulated conductor 1b. The weight-supporting lay 1a is suitably anchored in a socket 2, while the conductor 1b extends therethrough. The socket member 2 is sealingly secured to a cap member 3 which in turn screws into the upper end of a shell 15.

The lower end of the shell 15 is provided with a bore of reduced diameter forming with the main portion of the shell a shoulder 15a. Above the shoulder there is supported in alternating relation a series of spacer rings 16 and planetary gear supporting plates 17. A spacer tube 18 rests upon the uppermost gear supporting plate 17 and supports a motor 19. Said motor, spacer tube, spacer rings and supporting plates are secured in position by a collar 20 screwthreaded into the shell from its upper end and bearing against the motor casing. The supporting plates 17 are prevented from turning by lugs 17a which extend into channels formed in the walls of the shell 15.

The upper end of the motor 19 carries a contact 21 which is suitably engaged by a terminal, not shown, connected with the core 1b of the cable and supported in the cap member 3.

The motor 19 is provided with a shaft 19a in which is interposed a flexible coupling 19b. The lower end of the shaft 19a extends through a packing gland 22 provided on the uppermost supporting plate 17 and is fitted with a primary pinion gear 23. Said pinion gear 23 engages a plurality of planetary gears 24 which are journaled on pins 17b depending from the uppermost plate 17. The planetary gears 24 in turn engage an internal gear portion 25a of a double gear 25. Said double gear also includes a centrally disposed pinion gear portion 25b depending therefrom which extends through the next supporting plate to engage additional planetary gears 24.

After the desired number of pinion gears, planetary gears and double gears have been provided to accomplish the desired gear reduction, the lowermost set of planetary gears engage an internal gear portion 26a of a drive member 26. Said drive member is provided with an internally threaded driving socket 26b which fits into the bore at the lower end of the shell 15 and coacts with a correspondingly threaded stem 27a of an operating bar 27 so that rotation of the motor drives the operating bar axially.

The operating bar 27 is slidably mounted in a sleeve 28 which is secured to the shell 15, and in turn supports a packing gland 29 surrounding the operating bar 27. The operating bar is provided with a flange 27b therearound which includes key portions 27c adapted to slide in key ways formed in the sleeve 28 to restrain the operating bar against rotation.

The shell 15 is provided with depending brackets 15b, preferably arranged in diametrical pairs. Each bracket 15b journals a grappling arm 13, the extended inner side of which is serrated to form a jaw 13a. Each grappling arm 13 is pivotally connected intermediate its ends to a link 14. The several links 14 are in turn pivotally connected to the extended or lowered end of the operating bar 27. Movement of the operating bar in and out of the sleeve 28 shifts the jaws 13a radially inward and outward.

By providing a motor 19 adapted to drive in either direction said motor may be caused to shift the fingers inwardly or outwardly by positive action. It is therefore, possible to provide many different types and arrangements of jaws particularly formed to grasp special objects or "fishes" that may be in the wall. For example, arm members 30 may be used which are shaped to provide outwardly directed jaws 30a; the tool being lowered with the jaws positioned radially inwardly and operate by spreading the jaws.

The first described structure is likewise capable of utilizing specially formed jaws by using the force of the spring 12 for holding the jaws in their secured position, or by reversing the action of the spring and armature.

The arm members 13 may be held in their inner positions, such as shown in Figure 4, while the tool is being run into the well. When the arm members are so positioned, their outer sides act as guides to facilitate running of the tool.

By connecting a suitable ammeter or other electric current measuring device to the cable 1, and by providing means for measuring the load on the cable, it is possible to determine from the surface whether or not the fish is free or fast. Also such device or means also aids in determining when the motor stalls by reason of the grappling fingers being restrained against further movement.

I claim:

1. In an electrically operated fishing tool; the combination with a supporting and conducting cable; of a body member adapted to be lowered into a well bore; grappling means depending therefrom; a motor within said body member having a driving shaft concentric with said body member; gear reduction means actuated by said drive shaft, said gear reduction means comprising a plurality of planetary drive units arranged in series and having a reduced speed driving end arranged concentrically within said body member; and a screw jack incorporating the driving end of said gear reduction means and including an axially movable member operatively connected with said grappling means.

2. In a fishing tool adapted to be lowered into a well bore on a conductor cable; a body member; a plurality of grab fingers depending therefrom; a centrally disposed operating stem slidably and non-revolvably mounted in the lower end of the body member; link means connecting said stem with said grab fingers; said body member having a cavity in its upper portion; an electric motor mounted therein; a gear reduction unit below the motor having a slow driving end engageable with the said stem; and a screw drive means incorporating the engaging portions of said stem and slow driving end.

WALTER T. WELLS.